(12) United States Patent
Citterio

(10) Patent No.: US 6,990,886 B2
(45) Date of Patent: Jan. 31, 2006

(54) REINFORCED MULTILAYER FABRIC AND METHOD OF PREPARATION

(75) Inventor: Giorgio Celeste Citterio, Monza-Milan (IT)

(73) Assignee: F.LLI Citterio S.p.A., Monza-Milan (IT)

( * ) Notice: Subject to any disclaimer, the term of this patent is extended or adjusted under 35 U.S.C. 154(b) by 75 days.

(21) Appl. No.: 10/257,183

(22) PCT Filed: Apr. 12, 2001

(86) PCT No.: PCT/EP01/04300

§ 371 (c)(1),
(2), (4) Date: May 22, 2003

(87) PCT Pub. No.: WO01/78975

PCT Pub. Date: Oct. 25, 2001

(65) Prior Publication Data
US 2004/0045428 A1    Mar. 11, 2004

(30) Foreign Application Priority Data
Apr. 17, 2000    (IT)    ................ MI2000A0860

(51) Int. Cl.
*F41H 5/08*    (2006.01)
(52) U.S. Cl. ................... 89/36.05; 89/36.02; 2/2.5
(58) Field of Classification Search ........... 89/36.05, 89/36.02; 2/2.5
See application file for complete search history.

(56) References Cited

U.S. PATENT DOCUMENTS

| 5,591,933 A | | 1/1997 | Li et al. |
| 5,935,678 A | | 8/1999 | Park |
| 6,000,055 A | * | 12/1999 | Citterio ................... 2/2.5 |
| 6,119,575 A | * | 9/2000 | Dragone et al. .......... 89/36.05 |

FOREIGN PATENT DOCUMENTS

| EP | EU 0 572 965 A1 | * | 12/1993 | |
| EP | 0 805 332 | | 11/1997 | |
| FR | 2697626 A1 | * | 5/1994 | ............ 89/36.05 |
| WO | WO 94/23263 | * | 10/1994 | |

* cited by examiner

Primary Examiner—Stephen M. Johnson
(74) Attorney, Agent, or Firm—Hedman & Costigan, P.C.

(57) ABSTRACT

An unfinished reinforced multilayer fabric (11), able to produce a finished reinforced multilayer fabric (18) which includes an initial layer (12) of threads (13) parallel with each other, superimposed, with the interpositioning of a binding layer (14) on at least a second layer (12) of threads (13), these also being basically parallel with each other, where the threads (13) of the first layer (12) are set in various directions with respect to the threads (13) of the second layer (12) and the two layers (12) are also joined by a large number of binding threads (15), made of a thermoplastic, or thermosetting type material, or of a material which is water-soluble or soluble in a suitable solvent.

7 Claims, 2 Drawing Sheets

REINFORCED MULTILAYER FABRIC AND METHOD OF PREPARATION

The present invention concerns a reinforced multilayer fabric and a process for its production.

The fabric, according to the present invention, is particularly suitable for the production of bulletproof vests, helmets and any other passive article giving protection from munitions, fragments or other.

It is known that the conventional protection fabrics include two or more layers of superimposed threads, in which the threads of each layer are parallel with each other.

Between these two layers, a third binding layer such as a thermoplastic, thermosetting film, felt or resin, is also provided.

The two thread layers are also joined together by binding threads of textile material, which bind the threads of the two layers at the crossings. Such binding threads remain visible in the product even after the compaction stage.

The conventional production process of such a fabric has a weaving stage of the two or more layers, with the concurrent interpositioning of the binding layer and a subsequent compression or compaction phase. The fabric obtained in this way has high ballistic qualities since the superimposed layers are not mutually bound and, in any event, slipping is greatly hindered.

In fact, when the fabric is struck its fibres break up and, in this way, all working together, they absorb the energy of the projectile. However, it has been noted that in certain cases, when the fabric is hit by a projectile, its behaviour is different from that envisaged and previously described. Particularly, in certain cases, the projectile, though not causing sliding between the two superimposed layers, makes the fibrils, which make up the threads of each layer, slide over one another with virtually no friction. This phenomenon greatly reduces the breaking work of the fibres and hence the kinetic energy of the bullets which the fibres are able to absorb by being broken. In addition, at times, the projectile, without causing sliding between the two superimposed layers, separates the threads and splits off the fabric by passing through it. In practice, the fabric is split off without absorbing the kinetic energy of the bullet, i.e. without the same fibres being worked and broken. Moreover, the fabric is not very even, since the binding threads, which remain in the fabric after the weaving stage, prevent its uniform compaction at the following compression stage. The fabric formed therefore has contractions at the crossings between the threads of the two layers and of the binding thread.

Therefore, an object of the present invention is to obviate the technical drawbacks experienced by producing a reinforced multilayer material in which the fibrils, making up each thread, cannot slide over each other or, in any event, slide over one another with high friction.

Another object of the present invention is to produce a reinforced multilayer material in which the threads which make up the single layers cannot move over each other due to the effect of projectiles. In this way, since the fibres do not move, the fabric cannot open and the fibres, broken by the bullet, absorb its kinetic energy.

Another object of the invention is to produce a multilayer fabric which is basically even and that, in particular, does not have the many narrowings caused by the binding thread.

A further object of the invention is also to produce a process to make a multilayer fabric of the type indicated.

A still further object of the invention is to produce a reinforced multilayer fabric and a process for its production which are basically simple, safe and reliable.

These and other objects, according to the present invention, are reached by producing a reinforced multilayer fabric as claimed in claim 1 and by detailing a process as claimed in claim 10.

Other characteristics of the present invention are besides defined in the dependent claims. Advantageously, the reinforced multilayer fabric, according to the present invention, is relatively light and easy to wear. In addition, it requires a limited number of layers with respect to the number, which is necessary for conventional fabrics, the stopping capacity of the projectile being equal.

For example, a bulletproof vest can be produced in accordance with the class II NIJ 0101.03 provisions saving 15% in weight and by producing only 9 layers instead of 11, as is necessary for vests coming within class II produced using known fabrics.

Additional characteristics and advantages of the reinforced multilayer fabric and its production process, according to the present invention, will be made clearer by the following illustrative and non-limiting description, referring to the enclosed figures, in which.

Figure 1:
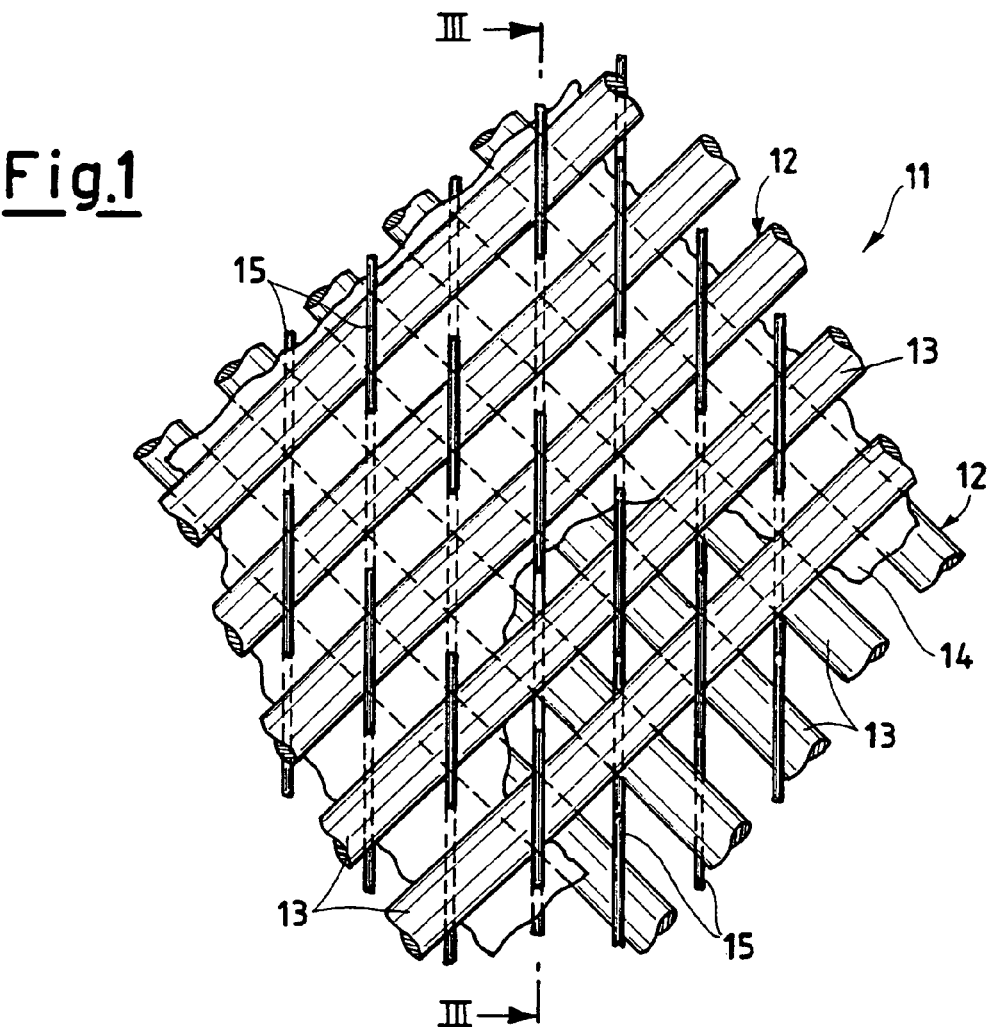
FIG. 1 shows a plan view of a portion of unfinished fabric able to produce a finished reinforced fabric, according to the present invention, with two superimposed parallel fibre layers.
Figure 3:
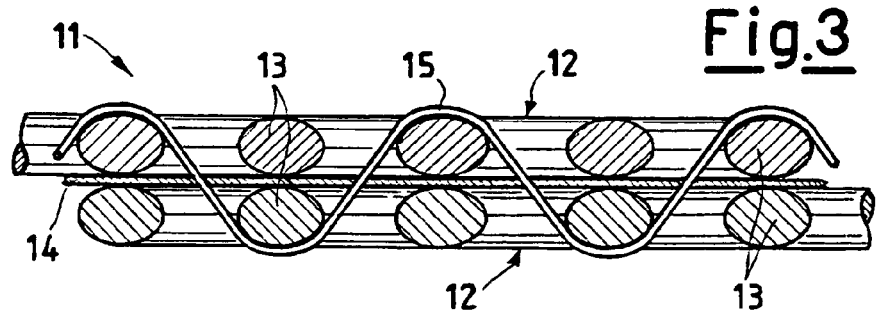
FIG. 3 shows a section made along the line III—III of FIG. 1.
Figure 2:
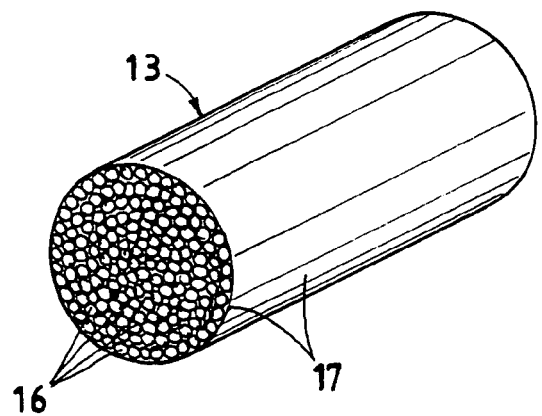
FIG. 2 shows an enlarged and cutaway perspective view of a single fibre of each layer.
Figure 5:
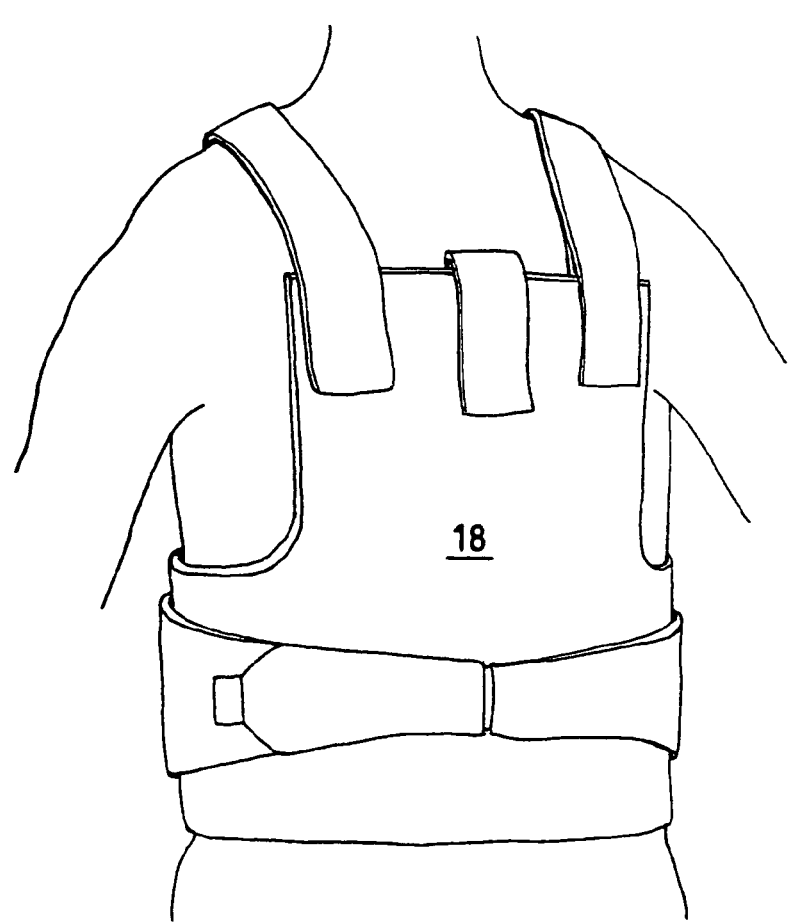
FIG. 5 shows a perspective view of a bulletproof vest made with the fabric according to the invention.

With reference to FIGS. 1–3, afterwards is shown a portion of a reinforced multilayer fabric at a partial production stage prior to the compaction stage, i.e unfinished. Such a portion is denoted, as a whole, by reference number 11.

The unfinished fabric 11 includes two layers 12 of threads 13 which are all parallel inside each layer 12. The threads 13 of one layer 12, instead, are set in various directions as regards threads 13 of the other layer 12 and form a 90 degree angle with respect to these, in an illustrative and non-limiting embodiment.

An additional binding layer 14 is included between the two layers 12 which keeps the layers 12 together and prevents layer 12 sliding over the other. In addition, the unfinished fabric 11 also has a large number of binding threads 15 which work together to keep the two layers 12 together. The binding threads 15 alternatively bind the threads 13 of one layer 12 and the threads of the other layer 12 at the crossing areas of the same threads 13.

Figure 4:
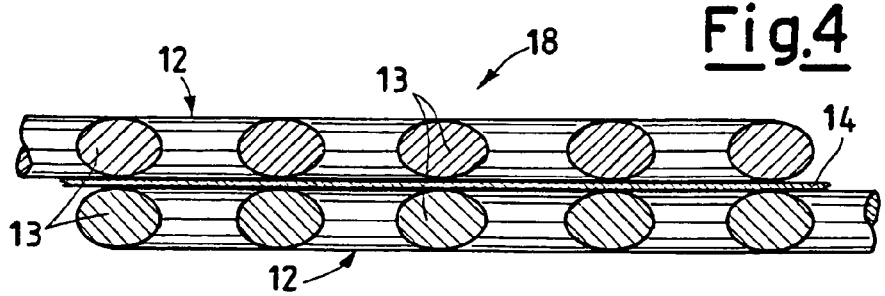
FIG. 4 shows a section of the finished fabric according to the invention.

In preferred and illustrative, but non-limiting embodiments of the present invention, a binding layer 14, made up of a pellicle or film of thermoplastic or thermosetting material or felt or powder, is provided between the two layers 12. Alternatively, each thread 13 can be pre-impregnated by suitable resins and in such case, the middle pellicle or film can be present or absent. In particular, as can be seen in FIG. 2, the threads 13 are made up of a large number of interwoven fibrils 16 to form the threads 13 and bound by a resin matrix 17, of thermoplastic or thermosetting type or by a mixture of the same. This phase of impregnation allows the single fibrils 16 making up threads 13 to work evenly, stopping the fibrils 16 of the single threads 13 from sliding over each other without friction. In practice, the delamination surface between the fibrils 16 increases with a consequent increase in the breaking work. The binding threads 15 are made of material which is thermoplastic or thermosetting or water-soluble or soluble in a suitable solvent. FIG. 4 shows the finished fabric upon termination of the production process, where such a fabric, according to the invention, is denoted as a whole by reference number 18.

The same references are used for identical or similar parts to those already described. In particular, the finished fabric 18 includes two layers 12 of threads 13 joined by the binding layer 14. The fibrils 16 of the single threads 13 are sunk in the matrix 17. It is clear that the finished fabric 18 does not have a binding thread 15 since it, being made of thermoplastic and/or thermosetting material or soluble material, becomes part of the layer 14 or is removed by a solvent.

The fabric 18, according to the present invention, is made by a process described as follows and this is also subject of the present invention. The process envisages an initial weaving stage to form the unfinished fabric 11 with the binding thread 15 of thermoplastic or thermosetting material or water-soluble or soluble in a suitable solvent. Such weaving stage can be implemented on known multiaxial machines which produce a continuous type of weaving process.

This phase is followed by a second phase of impregnation of the unfinished fabric 11 using a thermoplastic or thermosetting resin or which is made up of a mixture of the same.

Such second phase is carried out by passing through an impregnation line of total or partial immersion, spray or other type. The impregnation liquid is made up of a mixture containing a liquid in which the resin is dissolved or dispersed. Preferably such mixture includes a solvent such as ketones, alcohols, aromatic solvents or hydrocarbons, water, paraffins or mixtures.

The mixture has an extremely low viscosity so that the resin is able to penetrate inside the threads 13 and internally covers all the fibrils 16 which make up the single threads 13 set in the fabric.

In a different embodiment, the impregnation is carried out by combining a thermoplastic and/or thermosetting material with each of the fabric sides. The amount of resin applied is between 0.5% in weight of the threads 13 up to 150%. However, in preferred embodiments, the amount of resin applied is between 0.5% and 20% in weight. In a third drying phase, after the previous one, the fabric goes through an oven or a line which causes the solvent to evaporate. In a fourth compaction phase, after the previous one, the fabric is pressed and compacted at pressures and temperatures as in conventional methods. For example, the pressure may vary between $10^5$ Pa and $10^8$ Pa, while the temperature may vary between 25° C. and 250° C. Finally, in a fifth process phase, the finished fabric 18 is cut in the shapes and dimensions desired. Alternatively, according to a different process embodiment, the threads 13 are pre-impregnated with thermoplastic and/or thermosetting resins using an impregnation process which can replace and is basically identical to that previously described for the fabric 18. In such case, a weaving phase is carried out after the pre-impregnation followed by the process phases described previously.

In a preferred embodiment of the invention, the film or additional binding layer 14, which is provided between the two layers 12, has an elastic module at least the 10% bigger than the elastic module of the resin matrix 17, so as to prevent layers 12 sliding one over the other.

Moreover, the interposed layer 14, to be able to carry out its action, must impregnate only a portion of a single thread 13 which is placed on the upper layer 12 and next to each thread 13 of the lower layer 12, while it is also important that the matrix 17 impregnates the remaining portion of threads 13.

In such a way, according to the present invention, the reinforced multilayer fabric acquires the characteristics of a ballistic fabric, manufactured according to a non-stop production, which allows to prevent the corresponding two layers 12 of the ballistic threads 13 sliding one over the other and which allows all the fibrils 16, which compose every thread 13 of fibres to contribute to the halting of the projectiles through a complete delamination of the fibril 16 and resin 17 complex.

Therefore, the ballistic fabric, which is the object of the present invention, satisfies the above mentioned functions by the use of films or binding elements, placed between the adjacent layers of monodirectional ballistic fibres, which are inserted during a weaving phase of a multiaxial machine, and by the use of binding elements of the fibre layers, after the incorporation of the film between the two layers, which is obtained during the weaving phase, with the following application of the resin for those fibre portions that have not been covered by said films.

A subsequent compressing phase of the whole fabric allows the fastening of the surfaces which are in contact with the fibres placed between the two layers 12 and the impregnation of the fibre portions which are not impregnated by the film.

In particular, the binding layer 14 and the matrix 17 result mechanically different, in order to obtain different functions on various portions of the ballistic fibre, and finally they do not mix or they only partially mix together in limited contact areas.

Bulletproof vests have been made with the fabric according to the present invention and used to carry out tests. The results of which are contained later on also in relation to the results obtained in the same tests by a bulletproof vest made with a conventional type of fabric.

9 mm calibre DAG type bullets were used, weighing 123 grains (grs) and the following table contains the velocity (denoted by $v_{50}$) at which 50% of bullets are stopped by each fabric (the weight of the aforesaid fabric being equal):

TABLE

| 9 mm. 9 × 19 DAG RWS | New fabric | known fabric |
|---|---|---|
| $V_{50}$ | 510 m/s | 460 m/s |
| Kinetic energy of the projectile | 1040 J | 840 J |

It can be seen that the bulletproof vest made of the fabric according to the invention is able to stop bullets having 23.8% more kinetic energy and with 10% more initial velocity than bullets which, under the same conditions, vests of known materials were able to stop.

In practice, it is possible to make bulletproof vests in accordance with the class II NIJ 0101.03 regulations (relative to the protection levels) saving 15% in weight and using only nine superimposed layers instead of eleven superimposed layers required for the conventional fabric.

Alterations and variations to the present invention, apart from those already mentioned, are naturally possible thus, for example, the fabric may also have a binding layer at each of the external sides of layers 12.

It has in practice been confirmed how the reinforced multilayer fabric and the process for its production, according to the invention, are particularly advantageous, since they allow, on one hand, the elimination of the binding thread which does not provide any ballistic contribution and may even prove damaging and, on the other hand, allow the attainment of better ballistic performance compared to conventional fabrics equipped with such binding threads. As a matter of fact, using a binding thread made of thermoplastic and/or thermosetting material, the thread is not eliminated, but becomes part of the impregnation resin. Instead, the binding thread made of soluble material is effectively eliminated during the impregnation stage due to the presence of solvents. In the fabric according to the present invention, the fibres are very evenly arranged thanks to the absence of a binding thread; this allows, upon projectile impact, better propagation of the sound waves along the fibres, improving the ballistic characteristics of the fabric. In addition, impregnation of the thread fibrils increases the delamination surface between the fibrils with a consequent increase in the deformation work; the impregnation also prevents the relative shifting between the fibres of each single layer, improving the ballistic characteristics of the product.

The reinforced multilayer fabric and the process for its production thus devised may undergo numerous alterations and variations all coming within the invention. Moreover, all the details may be replaced by technically equivalent elements. In practice, the materials used and their dimensions can be adjusted according to the technical requirements.

The invention claimed is:

1. A finished reinforced multi layer fabric (18) consisting essentially of:
    at least a first layer (12) of threads (13) parallel with each other, superimposed on
    at least one second layer (12) of threads also parallel with each other, the threads of said first layer (12) being set in various directions as regards the threads of the second layer;
    a binding layer (14) interposed between said first and second layer (12) to keep said layers together and to prevent one layer sliding over the other, wherein said binding layer comprises a film made of a material selected from thermoplastic resin, thermosetting resin, felt, or powder, and wherein
    said threads being made up of fibrils (16) which are impregnated with a resin matrix (17) which prevents said fibrils of a single thread from sliding over each other without friction and
    wherein the binding layer (14), interposed between the first and second layers (12), has an elastic modulus at least 10% bigger than the elastic modulus of said resin matrix (17).

2. The reinforced multi layer fabric according to claim 1, wherein said resin matrix (17) is made of a material selected from the group consisting of thermoplastic or thermosetting resins or a mixture thereof.

3. The reinforced multi layer fabric according to claim 1 wherein said binding layer (14) is placed in contact only with a portion of said threads (13) and said resin matrix (17) impregnates the remaining portion of said threads (13).

4. The reinforced multi layer fabric according to claim 3, wherein the resin matrix (17) discontinuously impregnates the remaining portion of said threads.

5. The reinforced multi layer fabric according to claim 1, wherein said binding layer (14) and the resin matrix (17) have different mechanical properties.

6. A finished reinforced multi layer fabric (18), consisting essentially of:
    at least a first layer (12) of threads (13) parallel with each other, superimposed on
    at least one second layer (12) of threads also parallel with each other, the threads of said first layer (12) being set in various directions as regards the threads of the second layer;
    a plurality of binding threads which keep said first and second layer firmly together,
    a binding layer (14) interposed between said first and second layer (12) to keep said layers together and to prevent one layer from sliding over the other, wherein said binding layer comprises a film made of a material selected from thermoplastic resin, thermosetting resin, felt, powder, and wherein
    said threads being made up of fibrils (16) which are impregnated with a resin matrix (17) which prevents said fibrils of a single thread from sliding over each other without friction and
    wherein the binding layer (14) interposed between the first and second layers (12) has an elastic modulus at least 10% bigger than the elastic modulus of said resin matrix (17).

7. The reinforced multi layer fabric according to claim 6, wherein said binding threads (15) are made of a material selected from thermoplastic and/or thermosetting resins, water soluble materials, or materials soluble in a solvent.

* * * * *